United States Patent [19]

Stuckey

[11] Patent Number: 4,503,636

[45] Date of Patent: Mar. 12, 1985

[54] POST AND CANTELEVERED RING PLANT/VINE SUPPORT STRUCTURE

[76] Inventor: William C. Stuckey, 1503 Virginia St. E., Charleston, W. Va. 25311

[21] Appl. No.: 519,659

[22] Filed: Aug. 2, 1983

[51] Int. Cl.³ .............................................. A01G 17/06
[52] U.S. Cl. ........................................... 47/44; 47/47; 256/53; 256/48
[58] Field of Search .................. 211/71; 248/530–533, 248/539, 514, 518, 529, 205 B; 256/53, 48, 52; 403/346, 207, 209; 47/47, 44

[56] References Cited

U.S. PATENT DOCUMENTS

| | | | |
|---|---|---|---|
| 1,377,832 | 5/1921 | Hanner | 47/47 |
| 1,714,388 | 5/1929 | McBride | 256/52 |
| 4,232,467 | 11/1980 | Stewart | 248/533 X |

FOREIGN PATENT DOCUMENTS 561004  4/1975  Switzerland ............................ 47/47

Primary Examiner—Robert A. Hafer
Assistant Examiner—Danton DeMille
Attorney, Agent, or Firm—Jim Zegeer

[57] ABSTRACT

The plant/vine support disclosed utilized a channel shaped post having a U-shaped central portion and a pair of laterally projecting flanges with locking lug pairs integrally formed on the flanges and a locking lug and shoulders in the U-shape of the post. The ring is provided with a complementary shaped locking structure which is coplaner with the ring support per se and adapted to interengagingly locking maneuver as well as a simple unlocking and disassembling maneuver. The rings are simple, stack flat and are far less susceptible of hooking with one another and thereby entangling themselves during storage.

9 Claims, 10 Drawing Figures

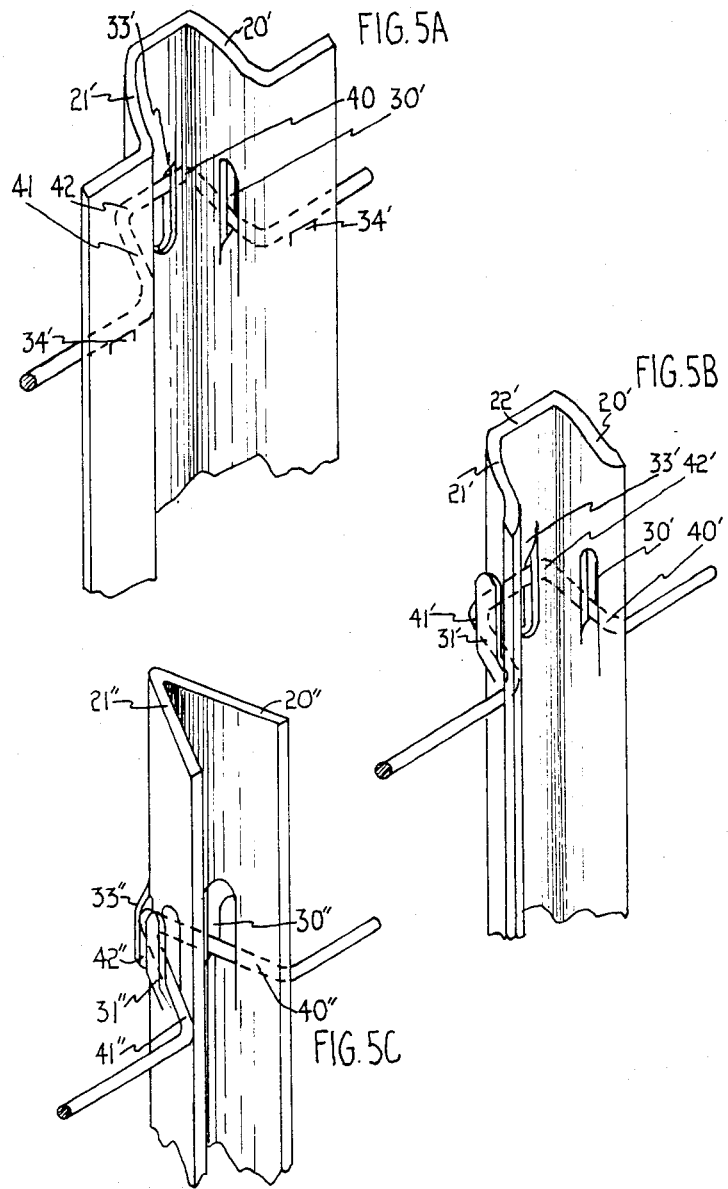

POST AND CANTELEVERED RING PLANT/VINE SUPPORT STRUCTURE

BACKGROUND OF THE INVENTION

The present invention is directed to improved plant/vine support of the type wherein a post is driven into the ground and the plant supports are cantelever supported from the stake or post. There have been a number of efforts in the past to provide such plant/vine support. In Orthman, U.S. Pat. No. 3,731,429, a plurality of ring assemblies are provided each ring assemblu having a plurality of of rings of different diameters secured in frustroconical shape and a "T" shaped post is utilized with shoulders on the post cooperating with holes on a bracket secured to the ring assemblies so as to support the ring assemblies in cantelever fashion from the cross of the "T" shaped post. While adequate support is provided by this type of assembly, it is complex and the rings cannot be easily stacked or shipped and can interengage, entangle and lock with another making re use a time consuming and expensive problem. In Barnhart, U.S. Pat. No. 2,152,018, a stake or post has a pair of struck out prongs or fingers which engage an annular ring 3 which has a pair of inwardly projecting prongs so as to butt against the standard member of the post. In Peterson U.S. Pat. No. 2,851,823, an adjustable plant support is disclosed wherein a circular post has a friction locking element thereon and an opening or slot in the locking element into which a downwardly projecting loop on an annular ring is inserted to provide an adjustable support. In Worthington, U.S. Pat. No. 2,764,846, a post is disclosed as having pivoted thereon annular rings which have a downwardly projecting hoop member which serves as a stop for each ring. In Effley's U.S. Pat. No. 1,627,495, the annular loop or ring has a downwardly projecting arm which has a prong formed at the end thereof which is inserted into one of a plurality of holes in the post to provide for height adjustment. Stanley's U.S. Pat. No. 1,627,803 discloses a ring with a screw clamp for adjusably positioning the ring on the post.

According to this invention, in a first embodiment, the post, which is similar to the conventional garden fence posting, is provided with wider than normal flanges into which are formed locking lug pairs. An oppositely opening locking lug is formed in the "U" of the U-shaped portion of the post. The continuous ring or loop is provided with a coplanar U-shaped section which fits inside the U of the U-shaped post to engage the underside of the locking lug therein. In a second embodiment the parts are reversed. The advantages of this invention are that all parts of the ring are coplanar, (in a single plane) and very thin and are far less susceptible of entanglements making it easlier to store and making it easier to engage and disengage the rings from the post. In addition, in this case, bracing is provided by the locking lugs in the lateral flanges and a pair of indentations on the interior of the legs of the U which bear against the undersides of the legs of the U shaped section of the ring member.

In a further embodiment, the U of the post is inside of the U of the ring and the locking lugs are in the legs and base of the U but project from the exterior surface thereof. The post may also be a V-shaped channel member. In all embodiments the ring and all parts thereof are substantially coplanar.

BRIEF DESCRIPTION OF THE DRAWINGS

The above and other objects advantages and features of the invention will become more apparent when considered with the following specification and the accompanying drawings wherein:

FIGS. 5a, 5b and 5c are further modifications of the invention, and

DETAILED DESCRIPTION OF THE INVENTION

Figure 6:
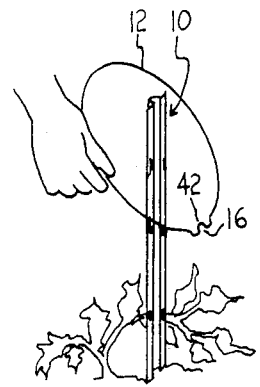
FIGS. 6, 7 and 8 show the method of assembling the ring shown in FIGS. 2 and 3 to the post according to his invention.
Figure 7:
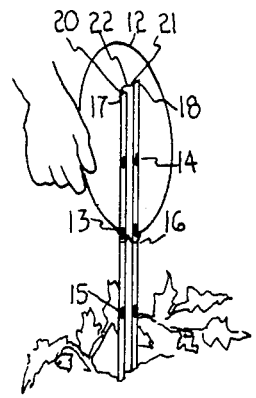
Figure 8:
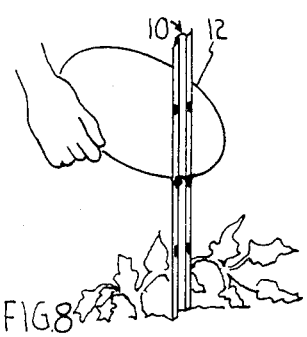
Figure 1:
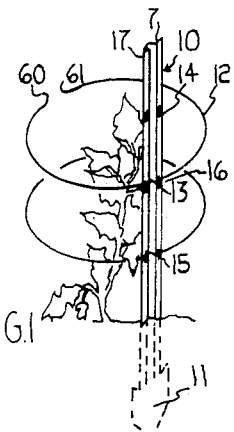
FIG. 1 is an isometric view of a cantilever ring-post support assembly incorporating the invention.

As shown in FIG. 1, post 10 may have a plate 11 secured as by welding or otherwise to lower end thereof for maintaining the post after it has been driven into the ground. It will be appreciated that as the post is to be reused that there may be instances where it is desired to eliminate plate 11 so that the post may be more easily withdrawn from the ground. Post 10 is provided with a plurality of lug-hook elements 14 to be described more fully hereafter with connection with FIG. 4 which are distributed along the length of post 10. In this embodiment, post 10 is provided with a pair of laterally projecting flanges 17 and 18 and a central U shaped portion 19 having a pair of legs 20 and 21 and a base portion 22.

Figure 3:
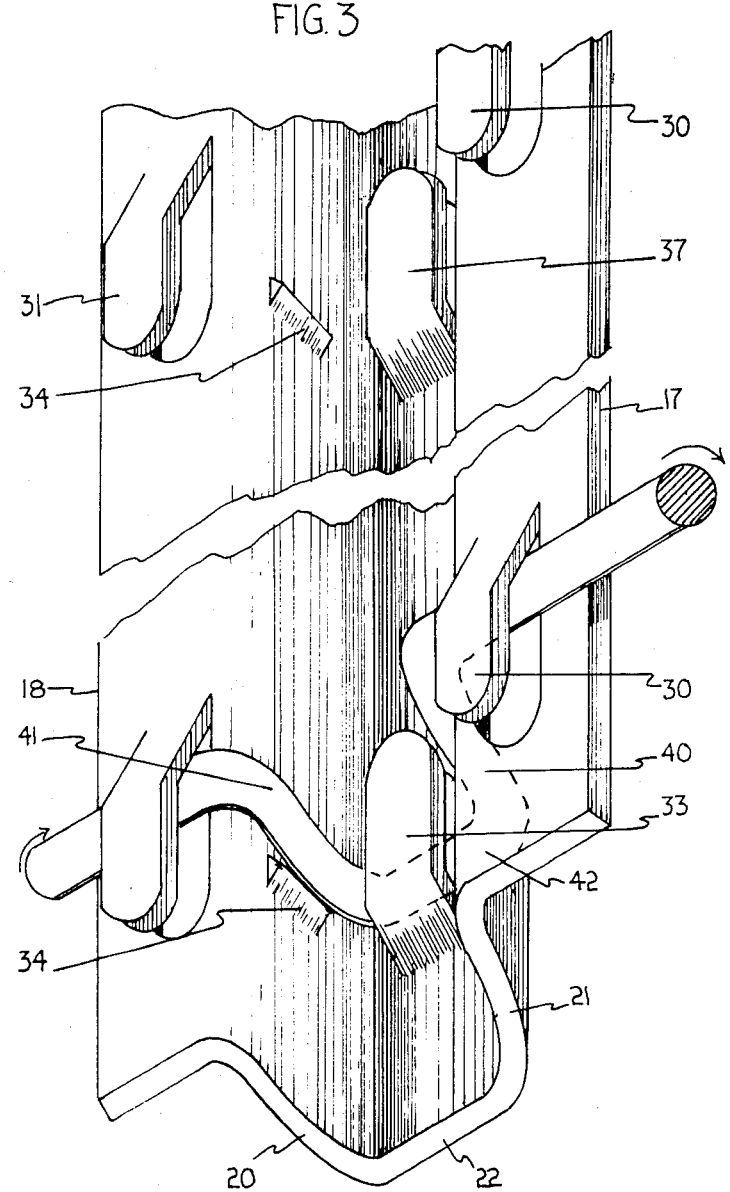
FIG. 3 is an enlarged isometric view showing the interengaging and locking of the U on the ring with the locking lugs on the post.

The enlarged view of FIG. 3 shows a pair of parallel locking lugs 30 and 31 formed in the lateral flanges 17 and 18, respectively of post 10. The central portion of post 10 is provided with a U-shaped channel section having legs 20 and 21 and the base 22 of the U. A similar but oppositely opening locking lug 33 is struck out from the base 22. Stabilizing proterbances 34 and 35 are formed in the legs 20 and 21, respectively.

The ring or loop 12 in the preferred embodiment is a continuous loop with the ends thereof being welded together. A locking structure 16 is formed in the loop coplaner with the body thereof, U-shaped locking structure 16 is substantially complementary shaped relative to the U-shape of the post and has a pair of projecting legs 40-41 and an outer base section 42. As shown in FIG. 3 the outer section 42 hooks under and engages under lug 33 whereas the legs 40 and 41 butt up against indentations or portubances 34 and 35, respectively.

Figure 2:
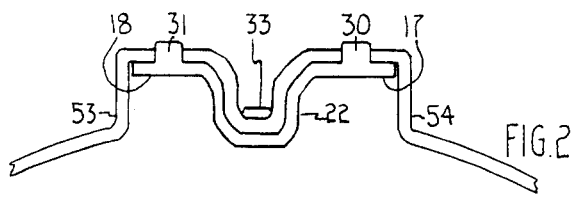
FIG. 2 is a top plan view thereof.

When a downward force is applied to the ring or loop 12 at a point diametrically opposite the post 10, the loop tends to pivot about an axis of portions 50 and 51 spanning lugs 30-31, with any rotary motion being blocked by the interengagement of bar member 42 under locking lug 33 in the base 22 of the U shaped portion of post 10. Stabilization is enhanced whenever any off balance or unbalanced loading is applied to the ring or loop one side or the other of post 10 by protuberences or projections 34 engaging ring or loop portions 40–41. Assembly and disassembly is of utmost simplicity. With reference to the embodiment just described in FIGS. 1, 2 and 3, the ring or hoop 12 is slid over the post 10 down to the locking lug units to be utilized. The inwardly projecting loop 16 is positioned between legs 20 and 21 and the hoop canted at an angle so that the portions 50–51 of the hoop are engaged with locking lugs 30 and 31. The hoop is then rotated in a direction to engage leg 42 with locking lug projection 33.

Figure 4:
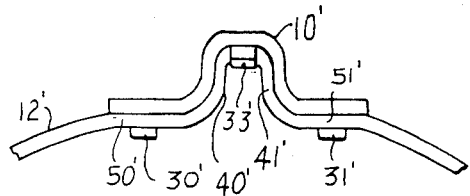
FIG. 4 shows a modification of the invention.

The embodiment shown in FIG. 4 merely reverses the parts and the directions of opening of the locking legs. In this embodiment, the "U" portion of the post faces in the opposite direction from the plant so that the legs 53–54 have been eliminated. The U-shaped member is an outward projection on the loop 12. The operation is essentially the same in that the loop portions 50', 51' are interengaged in the locking lugs 30' and 31' and the post is on the exterior or outside of the circumfrance of the hoop 12'.

As shown in FIG. 1 the ring or hoop need not be continuous in that the hoop may be provided with a locking hooks 60–61 which may be interengaged if desired as disclosed in Peterson, U.S. Pat. No. 2,851,823.

In the embodiment shown in FIG. 5 the U-shaped locking structure 16 of ring or hoop 12 is complementary shaped to the exterior of the U-shaped post 10. In this case the locking lugs 33 are on the exterior of the base 22' of the U-shaped portion of post 10 and locking lugs 30' 31' are in the sides 20' and 21' of the U shaped portion of post 12. In this embodiment the flanges 17 and 18 could be eliminated if desired. Alternately, the stabilizing projection 33 and 34 may be located on these flanges 17' and 18' as indicated at 33' and 34'. The post can also be a V-shaped channel with the downwardly opening locking lug at the base of the "V" and the upwardly opening locking lugs in the two sides of the "V" channel. The post can also be a rectangular channel member with the locking lugs struck out of three sides to provide the required three point locking and stabilizing engagement between the channel member and the plant supporting rings.

References is made to my concurrently filed application Ser. No. 06/519,658 for the various uses to which the plant/vine supports of this invention can be applied.

While I have shown and described the preferred embodiments of my invention, it will be appreciated that various modifications and adaptations may be incorporated therein and it is intended that such modifications and adaptions be included in the spirit and scope of the claims appended hereto:

What is claimed is:

1. A tomato plant support of the type having a post for driving into the ground and at least one endless ring plant support wire rod members releasably and lockably supported in cantilever fashion from said post, the improvement comprising, said post having a U-shaped central portion and a pair of laterally projecting flanges, locking lug means formed in said flanges and opening in an selected vertical direction, a cooperating locking lug formed in said U-shaped portion and opening in a opposite direction, and a complementary U-shaped member formed in said endless ring plant wire support member, said U-shaped element being adapted, in a single maneuver, to interengage and lock on said locking lug formed in said U-shaped member with contiguous portions of said plant wire support interengaging said locking lug means in said flanges.

2. The invention defined in claim 1 wherein said endless ring plant support wire rod members is circular and wherein said simple rotation maneuvering of said endless ring plant support wire rod member can be accomplished by one hand.

3. The invention defined in claim 1 wherein said endless ring and complementary U-shaped member formed thereon have no sharp surfaces and are substantially tangle free.

4. The invention defined in claim 3 wherein said endless ring and complementary U-shaped member are coplanar.

5. A plant/vine support of the type having a post adapted to be driven into the ground at a short lateral distance from the plant and at least one plant support wire rod member releasably and lockably supported in cantilever fashion from said post, the improvement comprising, said post being a channel member having at least a pair of sides and an area common to said pair of sides, a first locking lug struck from said area common to said pair of sides and opening in a selected direction, a pair of coplanar locking lugs, one of said pair of coplanar locking lugs being formed in each of said sides of said post, respectively, and opening oppositely to said selected direction, said plant support wire rod member having a portion which has a shape complementary to the shape of said common area and that portion of said pair of sides through said oppositely opening locking lugs, and is substantially coplanar therewith, whereby said plant support wire rod member is assembled and disassembled to said post by rotation thereof when seated in said oppositely opening locking lugs into and out of engagement with said first locking lug.

6. A tomato vine support comprising the invention defined in claim 5, wherein one of said plant support wire rod members is made of at least ¼ inch diameter wire and is a closed loop and said portion having a shape complementary to the shape of said common area and said pair of sides is U-shaped.

7. The invention defined in claim 5 wherein said channel member is U-shaped and a downwardly opening locking lug is formed on the base of said U-shaped channnal member and one each of said pair of coplanar locking lugs open upwardly in a side of said U-shaped channel member, respectively.

8. The invention defined in claim 5 wherein each said plant support wire rod member is an endless ring and said portion projects inwardly of said endless ring.

9. The invention defined in claim 8 wherein said endless ring is circular and wherein the simple rotation maneuvering of said plant support wire rod member can be accomplished by one hand.

* * * * *